United States Patent
Vishne et al.

(10) Patent No.: US 10,013,178 B2
(45) Date of Patent: Jul. 3, 2018

(54) METHODS, SYSTEMS AND COMPUTER READABLE MEDIA FOR OPTIMIZING STORAGE DEVICE BUS AND RESOURCE UTILIZATION BY HOST REALIGNMENT

(71) Applicant: SanDisk Technologies LLC, Plano, TX (US)

(72) Inventors: Gadi Vishne, Petach-Tikva (IL); Shai Baron, Ramat-Hasharon (IL); Judah Gamliel Hahn, Ofra (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/143,538

(22) Filed: Apr. 30, 2016

(65) Prior Publication Data

US 2017/0315727 A1 Nov. 2, 2017

(51) Int. Cl.
G06F 3/06 (2006.01)

(52) U.S. Cl.
CPC ............ G06F 3/061 (2013.01); G06F 3/0659 (2013.01); G06F 3/0679 (2013.01)

(58) Field of Classification Search
CPC ....... G06F 3/061; G06F 3/0659; G06F 3/0679
See application file for complete search history.

(56) References Cited

U.S. PATENT DOCUMENTS

| | | | |
|---|---|---|---|
| 8,516,190 B1 * | 8/2013 | Iyer ........................ | G06F 3/061 711/112 |
| 2007/0050593 A1 * | 3/2007 | Chen ..................... | G06F 3/0613 711/202 |
| 2008/0028162 A1 * | 1/2008 | Thompson ............ | G06F 3/0613 711/154 |
| 2010/0088458 A1 | 4/2010 | Kao et al. | |
| 2011/0047347 A1 * | 2/2011 | Li ........................ | G06F 12/0246 711/209 |
| 2012/0151115 A1 * | 6/2012 | Wolf ....................... | G06F 3/061 711/6 |
| 2013/0073784 A1 | 3/2013 | Ng et al. | |
| 2013/0191565 A1 * | 7/2013 | Tal ......................... | G06F 3/061 710/74 |

(Continued)

OTHER PUBLICATIONS

George Crump, "What is Storage Class Memory", Dec. 13, 2011.*

(Continued)

*Primary Examiner* — Edward J Dudek, Jr.
(74) *Attorney, Agent, or Firm* — Loza & Loza, LLP; Gabriel Fitch

(57) ABSTRACT

A method for optimizing storage device bus and resource utilization using host realignment includes detecting a first write command for writing data from a host device to a storage device. The method further includes determining whether the first write command includes addressing that is misaligned with regard to storage device resource assignments. The method further includes, in response to determining that the first write command includes addressing that is misaligned with respect to storage device resource assignments: determining an amount to shift the misaligned addressing to align the addressing with the storage device resource assignments; and notifying the host device of the misaligned addressing. The method further includes performing a host realignment according to the amount determined to shift the misaligned addressing.

24 Claims, 5 Drawing Sheets

(56) References Cited

U.S. PATENT DOCUMENTS

| | | | |
|---|---|---|---|
| 2014/0164681 A1* | 6/2014 | Ravimohan | G06F 12/023 |
| | | | 711/103 |
| 2014/0281161 A1 | 9/2014 | Chen et al. | |
| 2015/0089182 A1* | 3/2015 | Singh | G06F 11/00 |
| | | | 711/173 |
| 2015/0304421 A1 | 10/2015 | Squires | |
| 2016/0210242 A1* | 7/2016 | Fontenot | G06F 12/1036 |
| 2017/0052721 A1* | 2/2017 | Yamaji | G06F 3/061 |

OTHER PUBLICATIONS

"NVM Express," Specification Revision 1.2, http://nvmexpress.org/wp-content/uploads/NVM_Express_1_2_Gold_20141209.pdf, pp. 1-205 (Nov. 3, 2014).

"PCI Express," Base Specification Revision 3.0, pp. 1-860 (Nov. 10, 2010).

International Search Report and Written Opinion dated May 31, 2017 for PCT/US2017/020216.

* cited by examiner

METHODS, SYSTEMS AND COMPUTER READABLE MEDIA FOR OPTIMIZING STORAGE DEVICE BUS AND RESOURCE UTILIZATION BY HOST REALIGNMENT

TECHNICAL FIELD

The subject matter described herein relates to detecting misalignment of write operations to a non-volatile storage device and for aligning the write operations to optimize storage device bus and resource utilization.

BACKGROUND

Host computer systems that utilize non-volatile storage devices write data to the storage devices and read data from the storage devices using logical addressing. Such logical addressing is translated by the storage device to physical addresses, and the data is written to non-volatile storage on the storage device. Storage devices assign specific resources to logical address ranges to optimize utilization of internal storage device resources. For example, storage devices may assign individual processing elements to write data to specific memory dies, which correspond to logical address ranges.

Host computer systems are typically not aware of internal storage device resource assignments. As a result, when a host device performs write operations to a storage device, the write operations may be misaligned with respect to internal storage device resource assignments. For example, a misaligned write operation may start at a logical address that is offset from the address range assigned to a storage device processing element that writes data to the address range. This misalignment can cause sub-optimal use of storage device resources during write and during subsequent read operations. Such sub-optimal utilization of storage device resources can adversely affect host and storage device performance.

BRIEF DESCRIPTION OF THE DRAWINGS

The subject matter described herein will now be explained with reference to the accompanying drawings of which.

DETAILED DESCRIPTION

Figure 1:
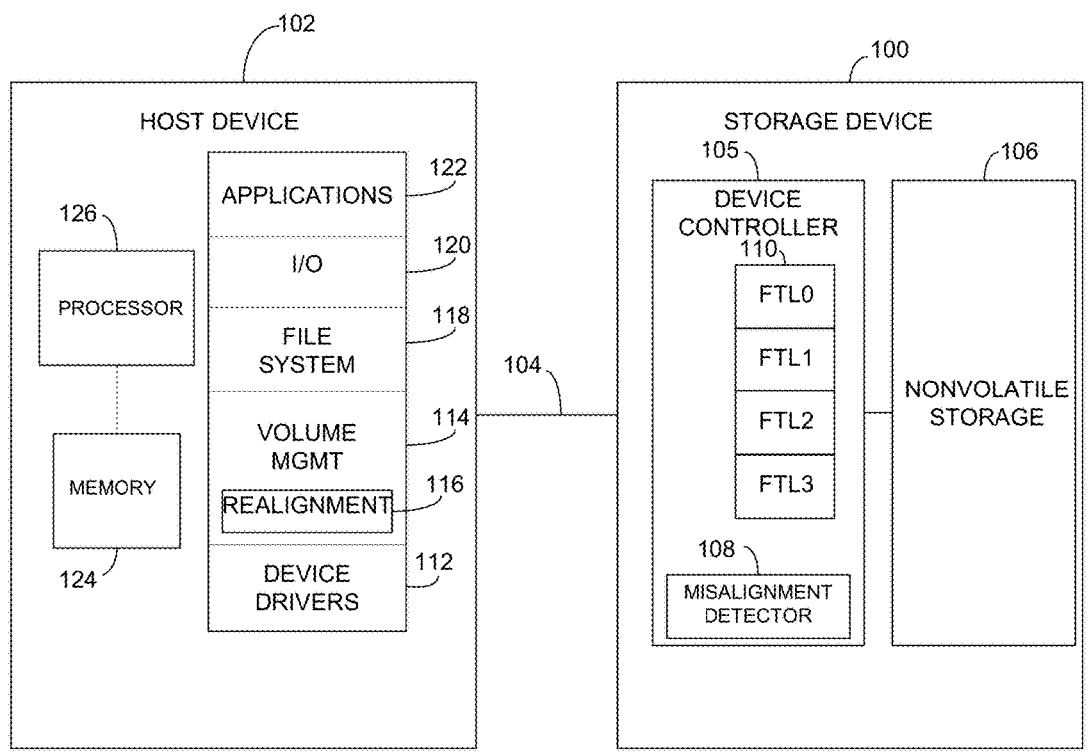
FIG. 1 is a block diagram illustrating a system for optimizing storage device bus and resource utilization by host realignment according to an embodiment of the subject matter described herein.

Methods, systems, and computer readable media for optimizing storage device bus and resource utilization by host realignment are disclosed. FIG. 1 is a block diagram of a system for optimizing storage device bus and resource utilization by host realignment according to an embodiment of the subject matter described herein. Referring to FIG. 1, a storage device 100 is connected to a host device 102 via a bus 104. Storage device 100 may be a flash memory based storage system that is either removable or imbedded within host device 102. For example, storage device 100 may be a solid state drive (SSD) or hybrid storage media that includes solid state components in combination with disk storage components.

Storage device 100 may be locally or remotely connected to host device 102. Storage device 100 includes non-volatile memory 106. Non-volatile memory 106 may be NAND flash memory, NOR flash memory, magnetic or optical disks, or any combination thereof. Storage device 100 also includes a device controller 105 that controls access to the non-volatile memory 106. In the illustrated example, device controller 105 includes a misalignment detector 108 that detects write commands with addressing that is not aligned with storage device resource assignments (hereinafter, "misaligned write commands"), notifies host device 102 of the misalignment, calculates the amount of shift required to align addressing in write commands with storage device resource assignment, and makes the calculation available to host device 102.

Host device 102 may be any suitable device that uses a non-volatile storage device. For example, host device 102 may be a carrier grade or retail grade computing device that interfaces with a flash based storage system and operates as a self-contained or network accessible computing environment. Host device 102 may be any of a mobile device, a personal computer, a server, a cloud computer, a large/hyper scale storage appliance, or any combination thereof.

In the illustrated example, host device 102 includes device drivers 112 that interface directly with storage device 100. For example, device drivers 112 may include non-volatile memory express (NVMe) over peripheral component interconnect express (PCIe) device drivers for communicating the storage device 100 via the NVMe protocol over a PCIe bus. Host device 102 further includes volume management 114 that includes a realignment module 116 that realigns write requests to correspond to internal resource assignment of storage device 100. Example realignments will be described below. Host device 102 further includes a file system 118, an I/O manager 120, and applications 122. File system 118 keeps track of file names, locations, and associated metadata. Input/output (I/O) manager 120 allows applications 122 to perform I/O operations to storage device 100. Applications 122 may include any suitable applications that access the computing resources of host device 102. From a hardware perspective host device 102 may include a processor 124 and memory 126 on which any of components 112 through 122 reside for execution.

Storage device resources are assigned to write data in particular amounts and to particular address ranges in non-volatile storage 106. In the illustrated example, storage device 100 includes flash translation layer (FTL) engines 110 that are assigned to specific logical block address (LBA) ranges in non-volatile memory 106. In one possible implementation, each FTL engine is fully utilized if it writes 256 kilobytes of data in a single access to non-volatile storage. Thus, each FTL engine may be assigned 128 logical block address ranges (1 logical block=2 kilobytes). Table 1 shown below illustrates exemplary FTL engine to LBA range assignments.

TABLE 1

Exemplary FTL Assignments to LBA ranges.

| FTL Engine Number | LBA Range |
| --- | --- |
| FTL0 | 0-127 |
| FTL1 | 128-255 |
| FTL2 | 256-383 |
| FTL3 | 384-511 |
| FTL0 | 512-639 |
| FTL1 | 640-767 |
| FTL2 | 768-895 |
| FTL3 | 896-1024 |

In Table 1, the first column illustrates flash translation layer engines FTL0 through FTL3. The second column illustrates logical block address ranges assigned to each FTL engine. It is understood that the assignments would repeat for the entire LBA range of storage device 100. Such repeating ranges assigned to each FTL engine are often referred to as stripes. Although the example in Table 1 illustrates equal assignments of LBA ranges to FTL engines, unequal assignments may also be utilized without departing from the scope of the subject matter described herein.

Figure 2A:
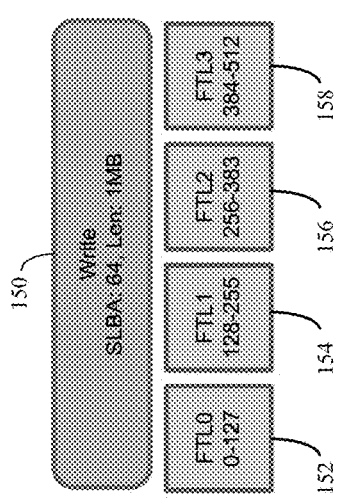
FIG. 2A is a block diagram illustrating an example of an aligned write operation.

If host device 102 issues a write command to storage device 100 and the write command is aligned with the LBA ranges illustrated in Table 1, each of FTLs 110 will be equally utilized. For example, if a one megabyte write operation arrives at storage device 100 and the starting address of the write command is logical block address 0, the first 256 kilobytes of the write will be written to nonvolatile storage 106 by FTL0, the next 256 kilobytes will be written by FTL1, the next 256 kilobytes will be written by FTL2, and the final 256 kilobytes will be written by FTL3. This example is illustrated in FIG. 2A. In FIG. 2A, block 150 represents a write command starting at starting logical block address (SLBA) 0 with a length of one megabyte. Blocks 152, 154, and 156 illustrate the assignment of the 256 kilobyte portions of the write to FTL engines FTL0 through FTL3. Because the data written by the write command is aligned with the LBA ranges assigned to the FTL engines, the FTL engines are equally utilized. In addition, because sequential data is written to sequential ranges of LBAs assigned to FTL0-FTL3, the subsequent read operations of the same data will also result in equal access to FTL engines FTL0-FTL3.

Figure 2B:
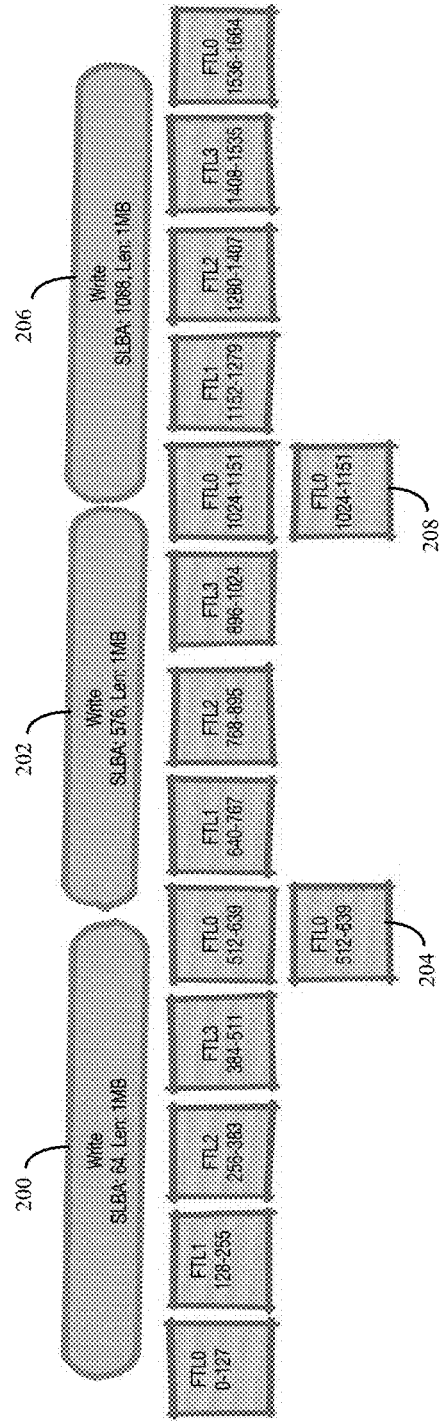
FIG. 2B is a block diagram illustrating an example of a misaligned write operation.

FIG. 2B illustrates the case where write commands issued by host device 102 to storage device 100 have addressing that is misaligned with storage device resource assignments. In FIG. 2B, host device 102 sends three one megabyte write commands to storage device 100. However, the starting addresses in the write commands are not aligned with the LBA ranges assigned to FTL0-FTL3. The first write command 200 starts at logical block address 64 and is one megabyte in length. As a result, the first write command results in accesses to FTLs 0, 1, 2, 3 and then again to FTL0 to receive the final 128 kilobytes of the write command. When the next write command 202 is received, because FTL0 was partially filled with the tail of write command 200, FTL0 is accessed again as indicated by block 204. Thus, FTL0 is accessed twice in succession to write the last part of the data from write command 200 and the first part of the data from write command 202. The same inefficiency occurs at the end of write command 202 when the tail of write command 202 is written to FTL0. Then when storage device 100 receives write command 206, FTL0 is accessed yet again to receive the first 128 kilobytes of the data from write command 206. The extra access to FTL0 between the second and third writes is indicated by block 208. The misalignment will continue to cause extra accesses to FTL0 as successive write requests are received.

Figure 2C:
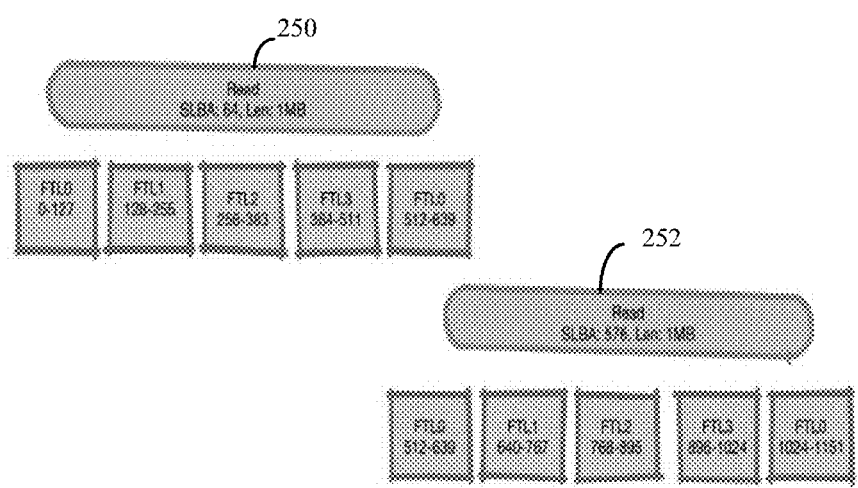
FIG. 2C is a block diagram illustrating an example of a misaligned read operation corresponding to the write operation illustrated in FIG. 2B.

In addition, on the subsequent read operations, FTL0 will be accessed twice as often as the other FTLs. For example, as illustrated in FIG. 2C, when a first read command 250 is received, FTL 0, 1, 2, 3, and 0 are accessed for the first read. Thus, FTL0 is accessed twice as often during the first read. When the second read 252 is received, FTL0 is likewise accessed twice as often as the other FTLs. In addition, FTL engines FTL0-FTL3 are required to perform the translation from logical addresses used by host device 102 to physical addresses used by storage device 100. Because FTL0 reads data from two different logical address ranges for each write command, FTL0 will be accessed twice as often as FTLs 1-3 for the address translations. Thus, misalignment of addressing in memory write commands wastes resources during subsequent reads.

In order to avoid this difficulty, misalignment detector 108 illustrated in FIG. 1 detects a write command with misaligned addressing and notifies realignment module 116 of host device 102 of the misalignment. Realignment module 116 then reads the amount of shift required to align the addressing and shifts the data by the required amount to achieve alignment. Returning to the example in FIG. 2B, the amount of misalignment is 64 logical block addresses. Accordingly, in FIG. 2D, realignment module 116 shifts the starting logical block address of write operation 200 by 64 logical block addresses such that operation 200 begins at logical block address 128 and ends at logical block address 639, resulting in equal accesses to FTLs 0 through 3. The subsequent write commands 202 and 204 are also aligned and result in equal accesses to FTL1-FTL3. The subsequent read operations will also result in equal accesses to FTL0-FTL3.

Figure 3:
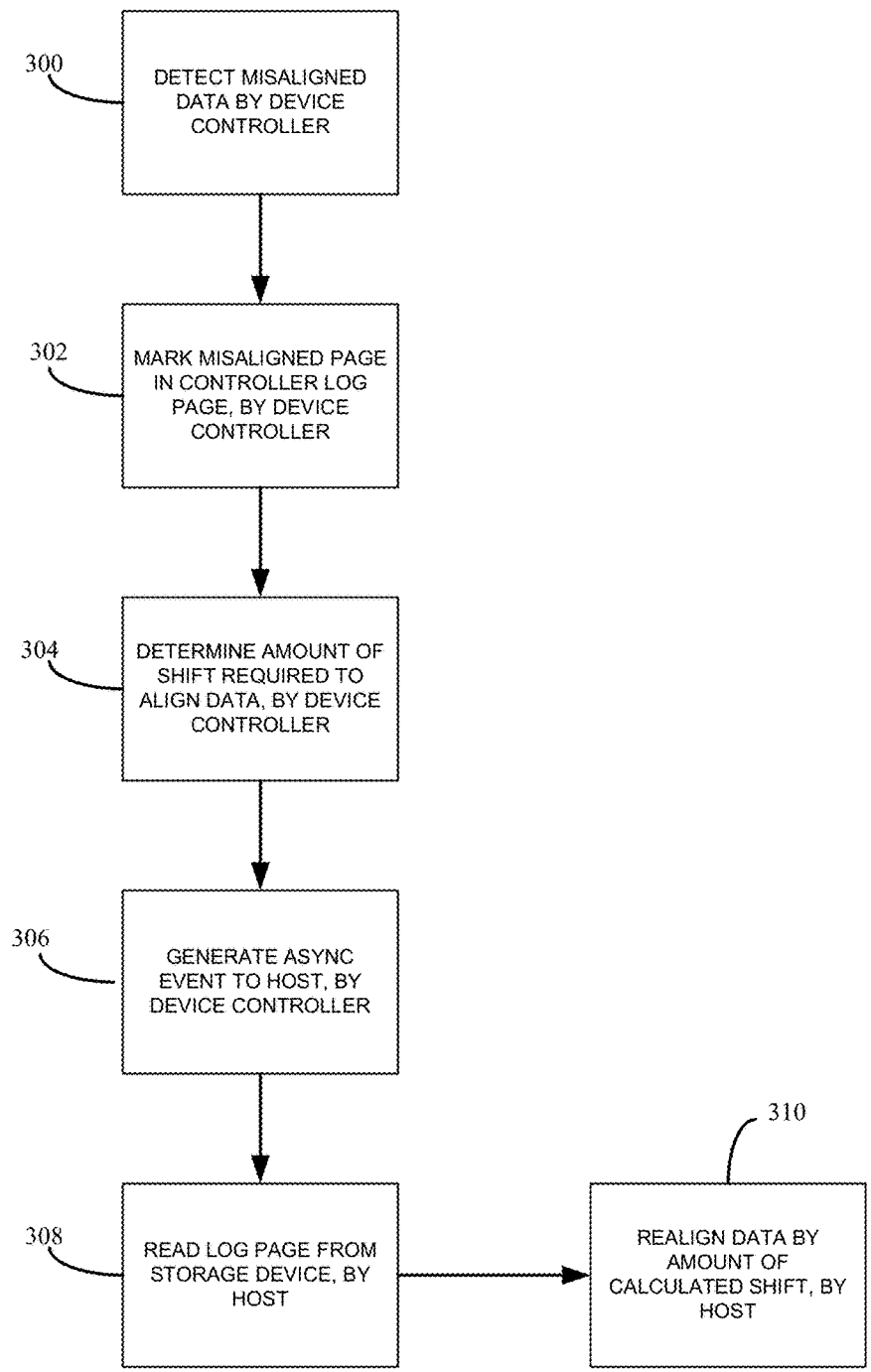
FIG. 3 is a flow chart illustrating an exemplary process for optimizing storage device bus and resource utilization by host realignment according to an embodiment of the subject matter described herein.

FIG. 3 is a flow chart illustrating an exemplary process for misalignment detection and host realignment according to an embodiment of the subject matter described herein. Referring to FIG. 3, in step 300, misaligned data is detected by the device controller. For example, device controller 105 illustrated in FIG. 1, may detect a write operation that will result in unequal utilization of FTL engines FTL0 through FTL3. In step 302, the device controller marks the misaligned page in the controller log page. For example, device controller 105 may mark the page corresponding to the write operation as misaligned. In step 302, the amount of shift required to align the addressing with storage device resource assignments is determined by the device controller. For example, device controller 105 may determine the amount of shift required to achieve alignment of the addressing in the write command with storage device resource assignment.

In step 306, the device controller notifies the host of the misalignment. For example, device controller 105 may notify host device 102 that the addressing associated with a write operation is not aligned with storage device resource assignments. The notification may occur via any suitable method. In one implementation, device controller 105 may communicate the misalignment via an asynchronous event notification to host device 102, which triggers host device 102 to read a log page maintained by device controller 105 to obtain information about the event.

Figure 2D:
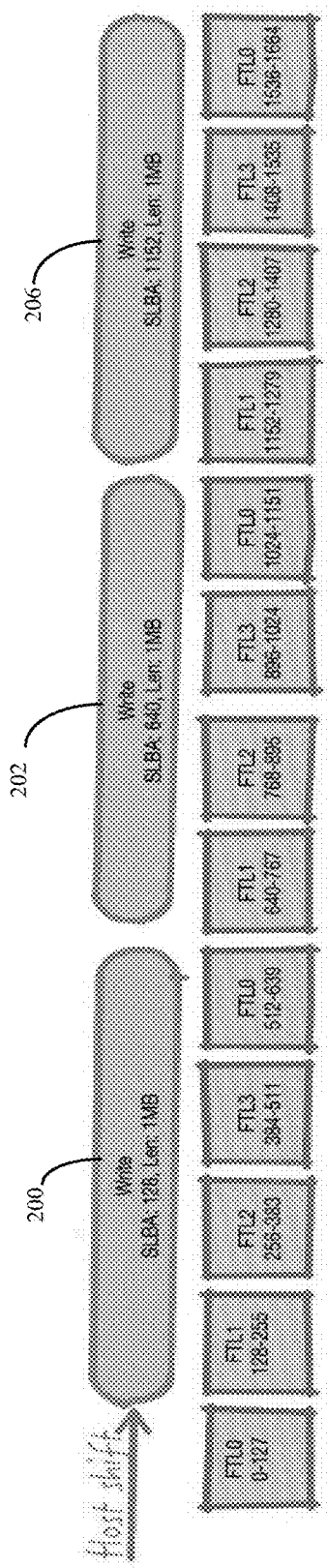
FIG. 2D is a block diagram illustrating an example of a realigned write operation using the subject matter described herein.

In step 308, host device 102 reads the log page from storage device 100 to determine the amount of shift required to realign the addressing with storage device resource assignments. In step 310, host device 102 realigns the addressing according to the requested shift. Realigning the addressing may include shifting the starting logical block address of the write operation to be aligned with the logical block address ranges assigned to the FTL engines, as illustrated in FIG. 2D. In one implementation, the data from the original misaligned write command written to storage device 100 may be allowed to remain misaligned in non-volatile storage 100. The addressing of subsequent write commands may be shifted so that the addressing is aligned with storage device resource assignments. In an alternate implementation, the addressing associated with the original misaligned write command may be shifted, and the data may be re-written to storage device 100. The addressing associated with subsequent write commands may likewise be shifted to align with storage device resource assignments.

The subject matter described herein thus improves utilization of storage device resources, such as FTL engines and the nonvolatile storage itself, without requiring modification of existing storage device protocols, such as NVMe. Storage device utilization will be especially enhanced when large files (e.g. on the order of gigabytes) are being written to storage device 100, and the addressing of the write commands is adjusted to avoid misalignment. Because utilization of storage device resources is improved, the storage device may process reads and writes from the host more efficiently, and host performance will likewise be improved.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

The subject matter described herein includes methods, systems, and computer readable media for optimizing storage device bus and resource utilization using host realignment. One method for optimizing storage device bus and resource utilization using host realignment includes detecting a first write command for writing data from a host device to a storage device. The method further includes determining whether the first write command includes addressing that is misaligned with regard to storage device resource assignments. The method further includes, in response to determining that the first write command includes addressing that is misaligned with respect to storage device resource assignments: determining an amount to shift the misaligned addressing to align the addressing with the storage device resource assignments; and notifying the host device of the misaligned addressing. The method further includes performing a host realignment according to the amount determined to shift the misaligned addressing.

One exemplary system for optimizing storage device bus and resource utilization using host realignment includes a device controller for detecting a first write command for writing data from a host device to a storage device, determining whether the first write command includes addressing that is misaligned with regard to storage device resource assignments, in response to determining that the first write command includes addressing that is misaligned with respect to storage device resource assignments: determining an amount to shift the misaligned addressing to align the addressing with the storage device resource assignments; and notifying the host device of the misaligned addressing. The system further includes a realignment module for performing a host realignment according to the amount determined to shift the misaligned addressing.

Although the examples described above relate to triggering the host to realign write operations for writes to a storage device that are misaligned with respect to assignment of logical block addresses to storage device resources, the subject matter is not limited to such examples. In an alternate implementation, the subject matter described herein can be used to trigger the host device to realign write operations for writes that are misaligned with respect to byte-addressable storage, such as storage class memory (SCM). In SCM, there is a preferred alignment of write operations to storage device resource assignments, but alignments or misalignments are measured in bytes. So if memory access is ideally aligned (for example) to an internal page of 4 kilobytes but can be accessed at an alignment of 4 bytes, the same mechanism described above for LBA realignment can be used to trigger the host to move its writes in units of 4 bytes to achieve a 4 kilobyte alignment when the host has a full page to write, even though unaligned accesses will succeed. The only difference is that instead of using LBAs as the atomic write unit (the smallest write or read that can be sent to the storage device), the atomic unit is in words (4 bytes).

The subject matter described herein includes a system for optimizing storage device bus and resource utilization using host realignment. The system includes means for detecting a first write command for writing data from a host device to a storage device and means for determining whether the first write command includes addressing that is misaligned with regard to storage device resource assignments. For example, the storage device controller may detect write commands from the host device and whether the write commands are misaligned. The system further includes means for, in response to determining that the first write command includes addressing that is misaligned with respect to storage device resource assignments: determining an amount to shift the misaligned addressing to align the addressing with the storage device resource assignments; and notifying the host device of the misaligned addressing. For example, the storage device controller may determine an amount to shift a misaligned write request and communicate that amount to the host. The system further includes means for performing a host realignment according to the amount determined to shift the misaligned addressing. For example, the realignment module may perform the realignment according to the amount determined by the storage device controller.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for optimizing storage device bus and resource utilization using host realignment, the method comprising:
   detecting a first write command for writing data from a host device to a storage device, the storage device comprising a plurality of resources assigned to respective logical address ranges;
   determining whether logical addressing of the first write command is misaligned with respect to the logical address ranges assigned to the resources of the storage device;
   in response to determining that the logical addressing of the first write command is misaligned:
      determining a shift amount to align the logical addressing of the first write command with the logical address ranges assigned to the resources of the storage device; and
      notifying the host device of the misaligned logical addressing, comprising providing the determined shift amount to the host device for use in performing host realignment according to the determined shift amount.

2. The method of claim 1, wherein determining whether the logical addressing of the first write command is misaligned comprises determining whether a starting logical address of the first write command is not aligned with a logical address range assigned to a resource of the storage device.

3. The method of claim 1, wherein determining whether the logical addressing of the first write command is misaligned comprises determining whether logical addresses of the first write command would cause unequal utilization of flash translation layer (FTL) engines of the storage device, each FTL engine assigned to write data associated with logical addresses within a respective one of the logical address ranges.

4. The method of claim 3, wherein determining the shift amount comprises determining an amount to shift the logical addresses of the first write command to align the logical addresses to with the logical address ranges assigned to the FTL engines.

5. The method of claim 1, wherein the shift amount is determined by a controller of the storage device.

6. The method of claim 1, wherein notifying the host device of the misaligned logical addressing comprises sending an event notification from the storage device to the host device.

7. The method of claim 6, wherein the host device reads the determined shift amount from the storage device in response to the event notification.

8. The method of claim 1, wherein performing the host realignment comprises:
   realigning data of the first write command according to the determined shift amount; and
   rewriting the realigned data of the first write command to the storage device.

9. The method of claim 1, wherein performing the host realignment comprises realigning logical addressing for write commands issued after the first write command in accordance with the determined shift amount.

10. The method of claim 1, wherein the storage device comprises a non-volatile storage device and the determined shift amount is in atomic units of logical block addresses.

11. The method of claim 1, wherein:
   the storage device comprises a storage class memory device; and
   the determined shift amount is in atomic units of data words.

12. A system for optimizing storage device bus and resource utilization using host realignment, the system comprising:
   a storage device controller comprising a plurality of resources, each resource assigned to one of a plurality of logical address ranges, the storage device controller configured to:
      detect a misaligned write command for writing data from a host device to a storage device in response to determining that logical addresses associated with the data are misaligned with the logical address ranges assigned to the resources of the storage device controller;
      determine a shift amount to align the logical addresses of the misaligned write command with the logical address ranges assigned to the resources of the storage device controller; and
      notify the host device of the detection of the misaligned write command; and
   a realignment module for performing a host realignment according to the determined shift amount.

13. The system of claim 12, wherein the storage device controller detects the misaligned write command in response to determining that a first logical address associated with the data is not aligned with a logical address range assigned to a resource of the storage device controller.

14. The system of claim 12, wherein the storage device controller detects the misaligned write command in response to determining that the logical addresses associated with the data would cause unequal utilization of flash translation layer (FTL) engines of the storage device controller.

15. The system of claim 14, wherein the storage device controller determines the shift amount to align the logical addresses of the misaligned write command to correspond with ranges of logical block addresses assigned to respective FTL engines of the storage device controller.

16. The system of claim 12, wherein the storage device controller determines the shift amount by comparing a first logical address of the misaligned write command to the logical address ranges assigned to the resources of the storage device controller.

17. The system of claim 12, wherein the storage device controller sends an event notification to the host device to notify the host device of the misaligned write command.

18. The system of claim 17 wherein, the host device reads the determined shift amount from the storage device controller in response to the event notification.

19. The system of claim 12, wherein:
   the realignment module realigns the data of the misaligned write command according to the determined shift amount; and
   rewrites the realigned data to the storage device.

20. The system of claim 12, wherein the realignment module realigns write data of write commands issued after the misaligned write command based on the determined shift amount, such that logical addresses of the write commands are aligned with the logical address ranges assigned to the resources of the storage device controller.

21. The system of claim 12, wherein the storage device comprises a non-volatile storage device and the determined shift amount is in atomic units of logical block addresses.

22. The system of claim 12, wherein the storage device comprises a storage class memory device and the determined shift amount is in atomic units of data words.

23. A system for optimizing storage device bus and resource utilization using host realignment, the system comprising:
- means for detecting a first write command for writing data from a host device to a storage device;
- means for determining whether logical addresses associated with the data of the first write command are misaligned with regard to storage device resource logical address assignments;
- means for, in response to determining that the logical addresses of the first write command are misaligned with regard to the storage device resource logical address assignments:
  - determining an amount to shift the misaligned logical addresses to align the logical addresses with the storage device resource logical address assignments;
  - notifying the host device of the misaligned logical addresses; and
  - providing the determined amount to the device for use in host realignment operations.

24. A non-transitory computer readable medium having stored thereon executable instructions that when executed by a controller of a storage device configure the controller to perform steps, comprising:
- comparing logical addresses associated with a first write command from a host device to logical address ranges assigned to resources of a storage device;
- determining whether the logical addresses of the first write command are misaligned based on the comparing;
- in response to determining that the logical addresses of the first write command are misaligned:
  - determining a shift to align the logical addresses of the first write command with the logical address ranges assigned to the resources of the storage device; and
  - notifying the host device of the determined shift, the host device to use the determined shift to realign data of subsequent write commands.

* * * * *